United States Patent [19]

Fite, Jr. et al.

[11] Patent Number: 5,517,324
[45] Date of Patent: May 14, 1996

[54] METHOD AND SYSTEM FOR INCREASING THE COMPATIBILITY OF A FAX MACHINE

[75] Inventors: Franklin Fite, Jr.; Arul Menezes, both of Bellevue; Sharad Mathur, Redmond, all of Wash.

[73] Assignee: Microsoft Corporation, Redmond, Wash.

[21] Appl. No.: 275,601

[22] Filed: Jul. 15, 1994

[51] Int. Cl.$^6$ ............................ H04N 1/32; H04N 1/327
[52] U.S. Cl. ............................................ 358/434; 358/438
[58] Field of Search ........................... 358/434, 435, 358/407, 442, 468, 400, 406, 436–440; 379/100

[56] References Cited

U.S. PATENT DOCUMENTS

| | | | |
|---|---|---|---|
| 5,016,115 | 5/1991 | Calkins | 358/442 |
| 5,111,307 | 5/1992 | Yoshino | 358/434 |
| 5,125,025 | 6/1992 | Lim | 358/434 |
| 5,208,682 | 5/1993 | Ahmed | 358/434 |
| 5,268,770 | 12/1993 | Yukino | 358/435 |
| 5,274,474 | 12/1993 | Medina | 358/435 |
| 5,339,174 | 8/1994 | Harris | 358/435 |

*Primary Examiner*—Scott A. Rogers
*Assistant Examiner*—Fan Lee
*Attorney, Agent, or Firm*—Klarquist Sparkman Campbell Leigh & Whinston

[57] ABSTRACT

An method and system for increasing the compatibility of a fax machine enables one to make a fax machine compatible with at least one other fax machine feature set. The invention includes selecting a compatibility module to handle a fax transmission based on a frame of information provided by another fax machine. The compatibility module interprets this information and maps it to a capabilities object. A messaging protocol module reads this capabilities object to determine the available capabilities.

21 Claims, 2 Drawing Sheets

METHOD AND SYSTEM FOR INCREASING THE COMPATIBILITY OF A FAX MACHINE

FIELD OF THE INVENTION

The invention relates to a method and system for making a fax machine compatible with a number of fax protocols.

BACKGROUND AND SUMMARY OF THE INVENTION

With the advent of "intelligent" fax machines having more sophisticated processors and memory, fax machine vendors have enhanced their fax machines to include an array of additional features. Such features include inbound routing via e-mail addresses, multi-hop relay, relay security, binary file transfer, etc. While these additional features improve the functionality of the fax machine, they also create a compatibility problem because each fax machine vendor may have a unique way of supporting them. Fax machine vendors have extended the "Group 3" facsimile transmission standard to support their additional features.

To understand the nature of the compatibility problem, it is helpful to first provide a background on the facsimile transmission standards. Most fax machines today conform to the Group 3 facsimile transmission standard. Established by the Comite Consultatif Internationals de Telegraphie et Telephonie (CCITT), Group 3 is one of the four groups defining facsimile transmission standards and is designed for digital data transfer over an ordinary telephone line. Within the Group 3 standard, there are various recommendations that relate to aspects of facsimile transmission. Recommendation T.4 defines a data compression standard, while Recommendation T.30 defines a protocol standard. In general, the Group 3 standard supports "standard" and "fine" images, two methods of data compression, password protection and polling. Office machines developed to communicate using the Group 3 standard are called "Group 3 office machines."

The T.30 protocol includes five phases of facsimile transmission: A) a call set up phase that includes establishing a call between a calling and receiving device; B) a pre-message phase that includes identifying and selecting data encoding and processing capabilities; C) a message transmission phase that includes transferring data, synchronization, error detection and correction, and line supervision; D) a post message phase that includes signalling the end of the message and confirming the message; and E) a call release phase that includes terminating the call.

During phase B, the calling and receiving devices exchange information to identify themselves and their capabilities. The receiving device transmits a digital identification signal (DIS) describing its data encoding and processing capabilities. The DIS characterizes the receiving device's standard CCITT capabilities. The receiving device may also send a Called Subscriber Identification (CSI) frame to provide its specific identity by its international telephone number. Finally, the receiving device may send a Non-Standard Facilities (NSF) data frame to identify the so-called "non-standard facilities" such as user identification information, passwords, and facsimile relay. The calling device sends various signals in response. The calling device sends a Digital Command Signal (DCS) responding to the standard capabilities identified by the DIS signal. The calling device may also send a Non-Standard facilities Set-up (NSS) signal in response to information contained in the NSF frame.

To support additional feature sets, fax machine vendors have extended the standard T.30 protocol and have developed unique NSF frames. Because vendors have unique NSF frames and have created their own versions of the T.30 protocol, a fax machine must be able to interpret the NSF frame and support the proprietary protocol implementation of another machine to fully take advantage of features available on the other machine. To solve this compatibility problem, it is necessary to develop a method for making a fax machine compatible with a number of protocol implementations.

Fax machines have been made to support non-standard facilities of another fax machine, but until this invention, a method has not been developed for easily modifying a fax machine to support feature sets of various fax machine vendors. Moreover, there exists no general way to increase the compatibility of a fax machine such that it may support any number of feature sets from various vendors.

There is thus a need for a fax machines that can support the non-standard features of a number of other fax machines. There is also a need for a way to improve fax machine compatibility that generally applies to today's intelligent fax machines. Finally, there is a need to provide a method to make it easier to add support for feature sets to a fax machine as different protocols are developed.

The object of the invention, therefore, is to provide a fax machine that is compatible with a number of fax machine protocols and also supports a broad range of fax capabilities. Another object of the invention is to provide method for increasing the compatibility of a fax machine that is generally applicable to fax machines of various vendors.

Yet another object of the invention is to provide a fax machine that may be easily modified to increase its compatibility with other machines and to provide a method for doing so.

To achieve these objects, the invention provides a method and system for increasing the compatibility of a fax machine with other fax machines and protocols. Typically incorporated into a fax machine, the method enables a fax machine to support a number of feature sets and their corresponding fax protocols. The method includes determining whether a second fax machine is compatible with the protocols supported in the fax machine. If the second fax machine is compatible, the method includes selecting a compatible protocol implementation based upon information provided by the second fax machine. The method may also include interpreting information describing the capabilities of the second fax machine and mapping this information into a capability object.

The system of the invention includes a protocol module, at least one compatibility module, and a messaging protocol module. In one embodiment of the invention, the protocol module may select a compatibility module based on information provided by a second fax machine during a telephone call. If a compatibility module is selected, the compatibility module interprets this information and builds a capability object from it. The compatibility module transfers the capability object to the messaging protocol module, which reads this object and determines which capabilities may be used in communicating with the second fax machine. Fax data and information about the fax such as the size of the fax message, type and number of recipients, image resolution, etc. may be transferred to the messaging protocol module using a message object. Both the protocol module and the compatibility module may communicate with the messaging protocol module using message and capabilities objects.

The invention provides several advantages. Using compatibility modules, vendors can overcome the compatibility problem caused by the variety of non-standard features that other vendors have implemented in unique ways. Vendors can provide support for their protocols by building compatibility modules without disclosing proprietary information. By adding compatibility modules to new intelligent fax machines, vendors can build intelligent fax machines that support non-standard features of a variety of other machines. Compatibility modules are very efficient because they can take advantage of proprietary techniques of a vendor and, at the same time, use a set of message functions, external to the compatibility module, to handle basic message processing functions.

The invention also allows a fax machine to support more non-standard features in addition to those associated with compatibility modules loaded in the machine. The invention may include a fax protocol module, separate from the compatibility modules, supporting additional features not available in the compatibility modules. The fax protocol module can be used to support additional features used during communication with other fax machines supporting a compatible protocol.

Regardless of the protocol used to transfer a message, the invention provides a common interface between the messaging protocol module that processes messages and the underlying protocol modules that are used to transfer messages. This common interface comprises message and capabilities objects. These objects provide a well-defined interface that enables the intelligent fax machine to support various protocols. Because of this well-defined interface, vendors can more easily build compatibility modules. In addition, all of the peculiarities of a given protocol may be absorbed in protocol modules. The messaging protocol module deals only with the message and capabilities objects, not the details of the underlying protocols.

Further advantages and features of the invention will become apparent to those skilled in the art from the following description and accompanying drawings.

DETAILED DESCRIPTION

The invention includes a method and system for increasing the compatibility of a fax machine with other fax machines and protocols. The invention allows fax machine vendors to build fax machines that support a very broad range of features or "capabilities" including, for example, polling for files by directory and name, inbound routing via e-mail addresses, multi-hop relay, relay security, and binary file transfer. The invention enables vendors to make new fax machines that support a broad range of these and other capabilities and, at the same time, maintain compatibility with vendors' existing feature sets and the specific versions of the standard T.30 protocol that correspond to them.

The following detailed description begins with an overview of a fax machine in which the invention may be implemented. The detailed description then provides a more detailed discussion of an implementation of the invention in a fax machine. Later, the detailed description explains the operation of the invention through the use of several examples. Though described in the specific context of software executed within a fax machine, the invention is not so limited. The invention may be implemented in hardware or software or a combination of both. To the extent that the invention, or portions of it, are implemented in software, the software may reside either in the fax machine or in a computer coupled to the fax machine.

Figure 1:
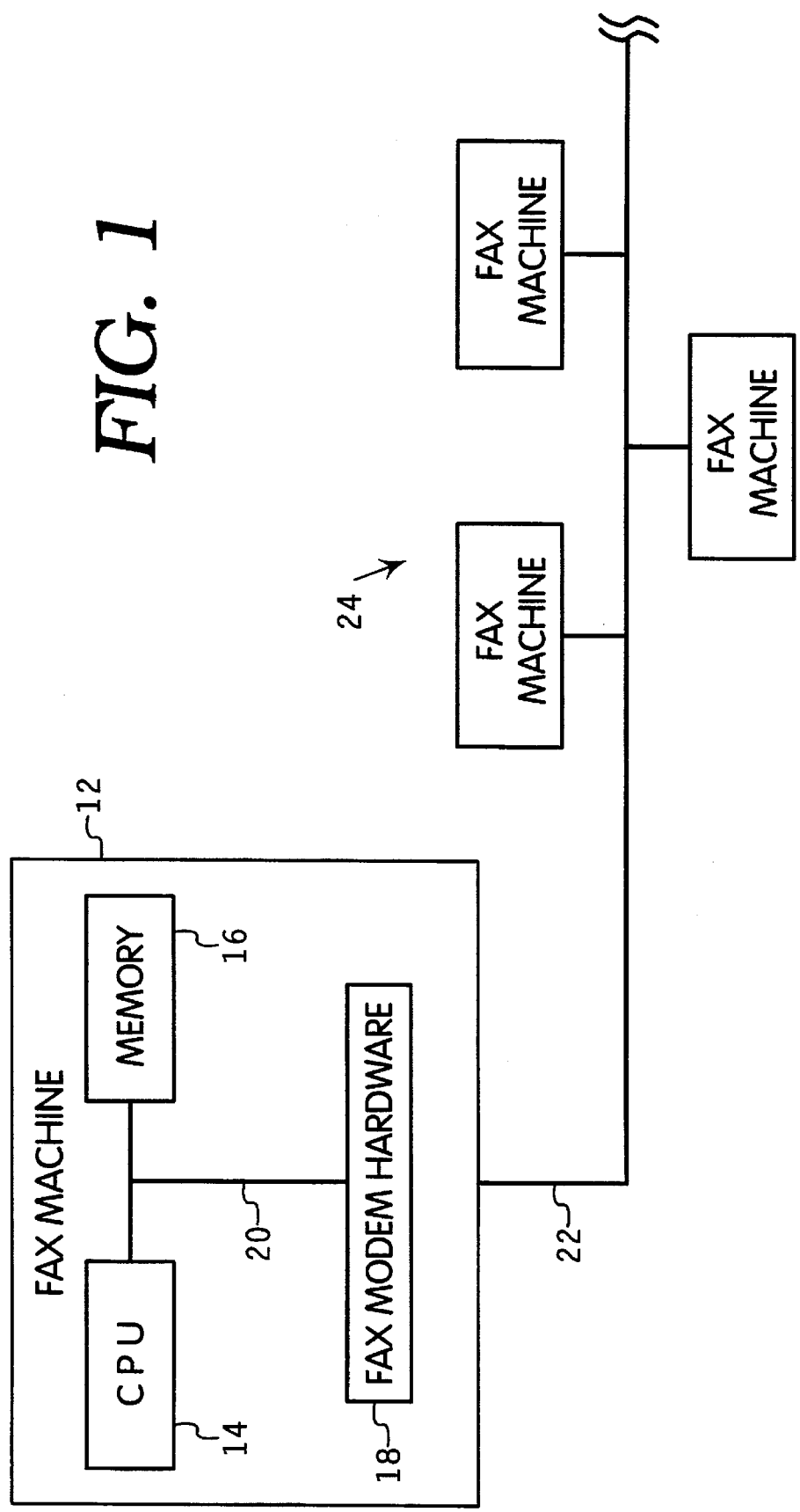
FIG. 1 is a block diagram overview of a network of fax machines including a fax machine according to an embodiment of the invention.

FIG. 1 is a block diagram overview of a network of fax machines 10 including a fax machine 12 according to an embodiment of the invention. The fax machine 12 includes a central processing unit (CPU) 14, memory 16, and fax modem hardware 18 coupled together through a bus 20. The bus may carry data signals, control signals and power to the various components in the fax machine 12. Any of a number of commercially available CPU's may be used within the invention, but the CPU 14 should preferably be a 286 microprocessor or more advanced processor from the x86 family of processors from Intel, Corp. The memory 16 may include Random Access Memory (RAM) and Read Only Memory (ROM). To more effectively carry out the invention, the memory 16 should include 1 MegaByte of RAM for loading software. The fax modem hardware 18 includes standard hardware to physically transmit and receive signals over the phone line 22. Using fax modem hardware 18, the fax machine 12 may communicate with a number of fax machines 24 through the phone line 22. Because such hardware is widely known and is not a crucial element of the invention, it requires no further elaboration here.

Figure 2:
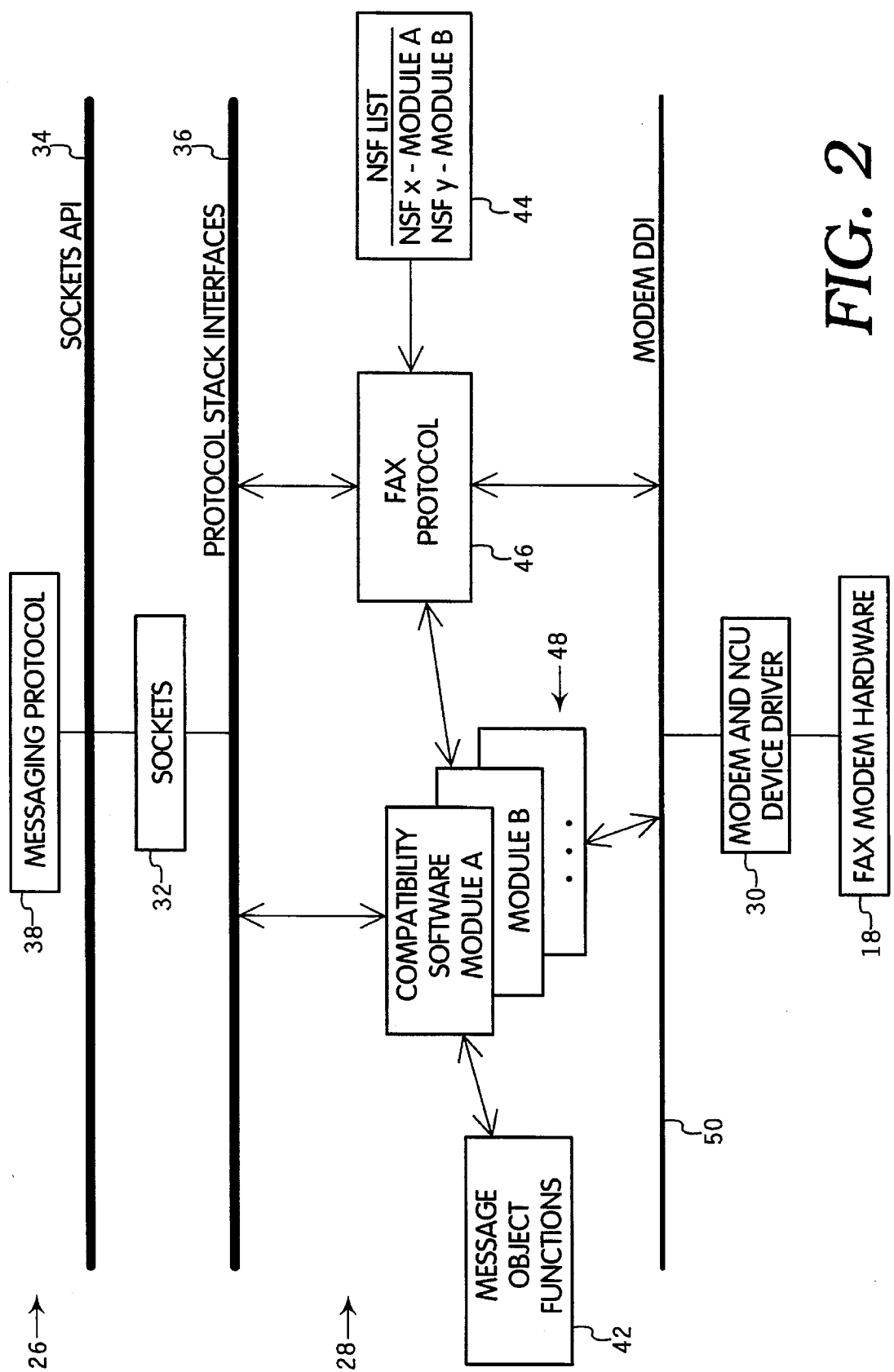
FIG. 2 is a block diagram of a system for increasing the compatibility of a fax machine according to an embodiment of the invention.

FIG. 2 is a block diagram of a system for increasing the compatibility of a fax machine according to an embodiment of the invention. This system may be implemented within a fax machine 12 as shown in FIG. 1. Aspects of the system may be implemented in software that is loaded in memory 16 and executed by the CPU 14 of the fax machine 12. The software portion of the embodiment includes two layers: 1) an upper layer 26; and 2) a sessions layer 28. The upper layer 26 includes software to process machine to machine or user-to-user messages such as a fax or e-mail. For example, the upper layer may process a fax message to be communicated from the fax machine 12 to another fax machine 24. The sessions layer 28 includes software to implement and support a transmission protocol for transferring messages and other data between the fax machine 12 and another fax machine 24. The modem and Network Connection Unit (NCU) device driver 30 provides the physical connection between this software, which is executed by the CPU 14 and resides in memory 16, and the fax modem hardware 18.

The upper and sessions layers 26, 28 communicate data by passing objects through sockets 32. The objects passed through these sockets include message objects and capabilities objects. The message object is a data structure including a header and one or more attachments. The attachment is the fax message data to be sent along the phone line, such as a binary file or a compressed bit map. The header is information about the fax message such as total size of the object, type and number of recipients, address of sender, passwords, image resolutions, relay points, etc. Used to define the capabilities of the fax machine, the capabilities object includes a series of fields corresponding to a list of capabilities. If a particular capability is supported, the field associated with that capability is filled with a value indicating the existence of the capability. Providing an interface between the upper and sessions layer of software, the message and data objects enable the upper layer 26 of software to operate the same way regardless of the version of the T.30 protocol used in the session layer 28.

Tables 1, 2, and 3 below illustrate examples of data structures that may be included in a capabilities object. The capabilities object may include several structures, each defining a group of capabilities. The data structures in Tables 1, 2, and 3 have a list of fields pertaining to capabilities and a comment string, separated from the respective fields, describing the meanings of the fields. Each structure begins with a GroupLength field indicating the number of bytes of the data field to follow. The GroupLength field helps the receiver of the data determine the beginning and end of the data in a particular group. The GroupLength is followed by a GroupNum data field, providing a unique identification of the particular capabilities group. The format for each group may vary following the GroupLength and GroupNum data fields.

porting those capabilities. For example, the fInwardRouting data field indicates the ability of the fax machine to route received messages to the final recipient. This group also contains fields to indicate the availability and version of message encryption (vSecurity), and compression (vMsgCompress). Other fields indicate the host operating system and the support, if any, for short flags, interactive protocols, data modem modulations, and data link protocols.

TABLE 1

```
typedef struct
{
  WORD   GroupLength    :6;  //length of this group in bytes
  WORD   GroupNum       :5;  //must be GROUPNUM_STD
  WORD   vMsgProtocol   :3;  //version of linearized msgs accepted
  WORD   fBinaryData    :1;  //accepts binary files in linearized msgs
  WORD   fInwardRouting :1;  //supports routing of recvd msgs
                             //2bytes
  BYTE   vSecurity      :3;  //version of msg security supported
  BYTE   vMsgCompress   :2;  //version of msg compression supported
  BYTE   OperatingSys   :3;  //which host operating system
  BYTE   vShortFlags    :2;  //how short can V.21 preamble be
  BYTE   vInteractive   :3;  //version of interactive protocol supported
                             //4bytes
  BYTE   DataSpeed      :5;  //Data modem modulations/speeds
                             //supported
  BYTE   DataLink       :3;  //Data-link protocols supported
                             //5bytes
}
BCSTD, near* NPBCSTD, far* LPBCSTD;
```

Table 1 illustrates the format of a Standard Capabilities Group. Fields in this group indicate the standard capabilities of the fax machine including the version of software sup-

TABLE 2

```
typedef struct
{
  WORD  GroupLength    :6;  //length of this group in bytes
  WORD  GroupNum       :5;  //group number--must be GROUPNUM_IMAGE
  WORD  fAnyWidth      :1;  //page pixel widths don't have to be exactly T.30
  BYTE  vCoverAttach   :3;  //version of digital cover pages accepted
  BYTE  vAddrAttach    :2;  //version of address bk attachments accepted
  BYTE  Undefined1     :1;
                            //3bytes
  BYTE  HiResolution   :4;  //Resolutions supported in addition to T.30
  BYTE  HiEncoding     :4;  //Encoding formats supported in addition to T.30
                            //4bytes
  BYTE  CutSheetSizes;      //Cut-sheet (not roll) Paper sizes supported
                            //5bytes
  BYTE  fOddCutSheet   :1;  //non-standard Cut-sheet sizes also available
  BYTE  Undefined2     :7;
                            //6bytes
}
BCIMAGE, far* LPBCIMAGE, near* NPBCIMAGE;
```

Table 2 illustrates the format of an Imaging Capability Group. This structure includes fields specifying advanced imaging capabilities beyond the standard CCITT recommendation T.30 imaging capabilities. For example, fAnyWidth describes whether page widths vary from the T.30 standard, or conform to the standard exactly. Other fields convey information regarding support for digital cover pages (vCoverAttach) and address book exchange (vAddrAttach). HiResolution and HiEncoding indicate whether advanced resolution and encoding schemes are supported in addition to those supported in the T.30 standard. The Imaging Capability Group may include other fields relating to support for printing formats.

understood that Tables 1–3 are merely examples of data formats of a capability object. The definition of the capabilities object and its contents may vary depending on the number and type of information to be conveyed.

Table 4 illustrates an example of a message header of a message object. As indicated previously, the message object may consist of a header and zero or more attachments. During a transfer of message object, attachments are combined into a single data block following the header. The attachment portion may include a parameter block to convey additional information about a message. The parameter block may include, for example, resolution and page size of a fax image.

TABLE 3

```
typedef struct
{
  WORD  GroupLength       :6;  //length of this group in bytes
  WORD  GroupNum          :5;  //must be GROUPNUM_POLLCAPS
  WORD  fLowSpeedPoll     :1;  //SEP/PWD/NSC poll reqs accepted
  WORD  fHighSpeedPoll    :1;  //PhaseC pollreqs accepted
                               //if both the above 00, poll reqs not accepted
  WORD  fPollByNameAvail  :1;  //Poll-by-MessageName msgs available
  WORD  fPollByRecipAvail :1;  //Poll-by-Recipient msgs available
  WORD  fFilePolling      :1;  //Supports polling for arbitrary files
                               //2bytes
  BYTE  vMsgRelay         :3;  //Version of Message Relay support
BCPOLLCAPS, far* LPBCPOLLCAPS, near* NPBCPOLLCAPS;
```

Table 3 illustrates a Polling Capability Group that contains fields describing the ability of the receiving fax machine to respond to polling requests. Polling is the capability to request a document or file from another machine using a document name or a file name. A fax machine may make this polling request alone or in combination with a message transfer during a phone call.

The Polling Capability Group includes data fields indicating the availability of low speed polling (fLowSpeedPoll), high speed polling (fHighSpeedPoll), polling by message name (fPollByNameAvail), polling by recipient (fPollByRecipAvail), and polling by file name (fFilePolling). This group also includes a field indicating the version of support, if any, for message relay (vMsgRelay). The structure may include other fields as well including fields relating to turnaround procedures and fields relating to additional capabilities of the fax machine. It should be

TABLE 4

```
typedef struct_LINHEADER{
    WORD                uHeaderSize;            //Size of this header
    WORD                uTotalSize;             //The total size occupied by the structure
    WORD                uMsgType;               //One of the #defines below
    WORD                uFlags;                 //Combination of defined flags
    WORD                uNumRecipients;         //Tells how many recipients there are
    WORD                rguRecipTypes[];        //Types of all recipients
}LINHEADER, FAR * LPLINHEADER, NEAR * NPLINHEADER;
/*
OTHER fields in the message header ...
    WORD                uszSubjectOffset;       //Subject for mail message
    WORD                uszSenderOffset;        //Address for sender
    WORD                uszPollNameOffset;      //Poll name for poll requests
    WORD                uszPasswordOffset;      //Password associated with request if necessary
    WORD                urgbAttachParamsSize;   //Size of parameter block for raw attachment
                                                //data after header
*/
//Possible Recipient Types
#define RECIP_DISPLAY           1
    //This instance of the message is not intended for this recipient. Information
    //is provided for display purposes only
#define RECIP_LOCAL             2
    //The recipient is local to the receiving machine
#define RECIP_RELAY             3
    //The recipient has to be reached via a series of relay points.
#define RECIP_RELAYPOINT
    //This is a relay point for one of the relay recipients.
//Possible Recipient Classes
#define RECIP_ORIG              0
#define RECIP_CLASS_TO          1
#define RECIP_CLASS_CC          2
#define RECIP_CLASS_BCC         3
//Possible message types
#define LINMSG_SEND             1
    //Normal send message. Subject can be valid, sender is always valid, and
    //PollName and Password are never valid. One or more of the RecipAddresses
    //will be valid.
#define LINMSG_POLLREQ_ADDRESS  2
    //Polls for a document for a particular address. Subject is not valid, Sender is
    //valid, PollName contains the address for which messages are desired, and
    //Password contains the password decided upon.
#define LINMSG_POLLREQ_FILE     3
    //Polls for a directory/file from the filesystem. Same as other poll requests
    //except that pollname stores the file system path which is to be retrieved.
#define LINMSG_POLLREQ_MSGNAME  4
    //Polls for a particular message name. Same as other poll requests
    //except that pollname stores message name.
#define LINMSG_POLLREQ_G3       5
    //Polls for any file which has been stored. None of poll name or password are valid.
    //Sender is valid. Subject and Recip addresses are not.
#define LINMSG_RELAYREQ         6
    //request permission to send a relay message. Password may be valid.
//Message type flags. All undefined bits are reserved
#define LIN_ENCRYPTED           0x0001          //Specifies whether the msg is
                                                encrypted
#define LIN_PUBKEY_ENCRYPTED    0x0002
#define LIN_IMAGE_ONLY          0x0004          //Specifies whether the msg
                                                contains only image data
#define LIN_RAWDATA_ONLY        0x0008          //Specifies that there is raw data
                                                following the header params for
                                                which are in urgbAttachParams
```

The message header in Table 4 includes a definition of the header structure and information about the message type and recipient type. For example, the message type may be a normal fax transmission (Normal Send), a poll request, relay request. The header may also identify the data type such as encrypted data, image data, or raw data. The message header may contain recipient list for the message and the sender's name and address. It should be understood that this message header is merely an example of the structure of a message header in a message object. The structure and contents of the message header may vary.

The message and capabilities objects are passed through the sockets using a Sockets Application Program Interface (API) 34 and a Protocol Stack Interfaces 36. The particular Sockets API 34 used in this implementation is a subset of the standard Windows Sockets API available from Microsoft Corp. of Redmond, Wash. The Protocol Stack Interfaces 36 are interfaces between the sockets 32 and the protocol modules in the sessions layer 28 that send and receive fax message data. These socket interfaces are widely used in computer network applications and are well known to those of skill in the art. One example of such a socket interface is the Transport Device Interface (TDI) described in the Software Developer's Toolkit for Windows NT from Microsoft Corporation. Though this implementation uses sockets 32, other well known communication mechanisms may be used such as NetBIOS and Netware, for example.

The upper layer of software 26 includes a messaging protocol module 38. The message protocol module 38 defines the message object including its structure, parts and meaning. In this context, the message is a fax, and the message object is simply the data structure representing the message. The messaging protocol module 38 transfers messages to an and from the sessions level through the use of the message object.

The sessions layer 28 includes software to select the proper protocol used to transfer fax data as well as software to handle the transfer of data. This software includes protocol modules, message object functions 42, and a list of compatible NSFs 44. The term "protocol module" in this context means a software module that sends and receives data to and from other fax machines using some version of the standard T.30 protocol. In this embodiment, the fax protocol module 46 and the compatibility modules 48 are "protocol modules" because they each provide a version of the T.30 protocol. The fax protocol module 46 includes a version of the T.30 protocol specifically designed to support a broad range of fax capabilities in the fax machine. The fax protocol module 46 is sufficient for communicating with other fax machines that support the same protocol and fax capabilities. However, vendors have already created their own implementations of the T.30 protocol to support their feature sets. To support these vendor specific protocols, the compatibility modules 48 provide the versions of the T.30 protocol corresponding to a the vendors' feature sets. It should be understood that a compatibility module could support any protocol and is therefore not limited to implementing the T.30 protocol or modifications to it.

Using the protocol modules, the sessions layer of software 28 can then support several versions of the T.30 protocol. For example, if the fax machine communicates with another fax machine that supports the T.30 protocol version of the fax protocol module 46, then the fax protocol module would control the sending or receiving of a fax using its version of the T.30 protocol. On the other hand, if the fax machine communicates with another fax machine that uses a different version of the T.30 protocol to support a particular feature set, then the fax machine uses the compatibility module 48 that supports that version of the T.30 protocol.

The sessions layer 28 includes software to select the proper protocol based upon information provided by another fax machine. In this implementation the fax protocol module 46 examines the NSF of another fax machine and determines which protocol module should be used with the call. If the NSF frame of the other machine matches the NSF of the fax protocol module 46, then the fax protocol module 46 handles the fax transmission. If the NSF frame does not match, however, then the fax protocol module 46 must determine whether the sessions layer 28 includes a compatibility module 48 that corresponds to the NSF frame.

In this case, the fax protocol module 46 determines the appropriate compatibility module 48 in one of two ways: 1) the NSF frame may identify a company name; or 2) the fax protocol module may compare information in the NSF frame with the NSF list 44 to try to find a match. In this particular embodiment, the latter approach is used. If the fax machine contains a matching compatibility module 48, the fax protocol module 46 passes control to this compatibility module 48. The compatibility module 48 then takes over control in sending or receiving a fax. If the fax machine does not contain a protocol module to support a particular NSF, then the call is terminated.

The compatibility modules 48 and the fax protocol module 46 communicate with the messaging protocol module 38 using message and capabilities objects. When the fax protocol module 46 handles a call, it creates a capabilities object from the information provided in the NSF frame sent by another machine. If the other fax machine is compatible with the fax protocol in the fax protocol module 46, then the fax protocol module 46 handles the call and creates a capabilities object by filling in the fields of the capabilities in the capabilities list that correspond to the capabilities of the other machine. This may be a subset of the total capabilities available in the list as in the case where the other machine is simply a standard Group 3 fax machine. On the other hand, the capabilities object may be the full list of capabilities available in the fax machine if it communicates with a similar fax machine. In sending a fax, the fax protocol module 46 receives a message object from the messaging protocol module 38 and processes the information based on the information in the message object header. In receiving a fax, just the reverse occurs. The fax protocol module 46 receives data from the modem and NCU device driver 30 and places it into message object, which is then passed to the messaging protocol module 38.

When a compatibility module 48 handles a call, it also uses capabilities and message objects. Once the fax protocol module 46 passes control to a compatibility module 48, the compatibility module 48 interprets the NSF frame and maps the information in the frame to the capabilities object. In sending and receiving faxes, the compatibility module 48 uses message objects in the same way as the fax protocol module 46.

To limit the amount of software that vendors must supply in the compatibility module 48, the sessions layer 26 makes available message object functions 42 to all compatibility modules 48. When building a message object while receiving a message or when interpreting a message while sending a message, the protocol modules must encode and decode variable length fields in the message object header. Message object functions perform this encoding and decoding. By making these message object functions 42 available to all compatibility modules 48, the amount of software in the system is reduced and vendors are not burdened with implementing these functions in compatibility modules 48.

The final part of the software not yet discussed is the interface between the protocol modules and the modem and NCU device driver 30. This interface is a modem device driver interface or modem DDI 50. Well-known in the industry, such DDIs establish software commands needed to control a modem. An example of a standard DDI is Class 1 for fax modems in personal computers.

The invention is more easily understood through examples of its operation. For the following examples, one should assume that the fax machine incorporating the invention (the first fax machine) is communicating with a machine that is not compatible with the fax protocol associated with the fax protocol module 46. The first fax machine does, however, have a compatibility module 48 that corresponds to the machine it communicates with.

In the first example, the user of a first fax machine incorporating the invention sends a Group 3 fax to a second fax machine that is not compatible with the fax protocol module 46. This is a "plain old" fax—no relay or other extended features are used. In this example, the second fax machine supports the relay feature, but it is not being used.

1. The messaging protocol module 38 sends a dial command with a phone number to the fax protocol module 46. The fax protocol module 46 dials the phone, makes the fax connection, and waits for the receiving machine to send the proper frames.
2. The receiving fax machine sends its NSF frame to the sending fax machine.
3. The fax protocol module 46 receives the NSF/CSI/DIS information and compares the NSF ID IDS to the first fax machine's NSF ID. They do not match. The fax protocol module 46 then compares the received NSF ID to the NSF ID in the NSF list 44. A match is found. The fax protocol module 46 calls the compatibility module 48, passing it the received NSF/CSI/DIS.
4. The compatibility module 48 is now running the T.30 protocol. It builds a capabilities object from the passed NSF/CSI/DIS. It sets the relay capability field to "yes" (example only—the actual bits to set are not relevant at this point). The compatibility module 48 passes this capabilities object to the messaging protocol module 38.
5. The messaging protocol module 38 sends the message object with the T.4 compressed image to the compatibility module 48. The compatibility module 48 uses the message object functions 42 to decode the message object header and find the parameter data block for the image. It uses this data block to determine the resolution, encoding type, etc., which are then sent to the receiving machine in the DCS (or NSS etc. as per the second machine's protocol).
6. The compatibility module 48 then sends the data from the message object to the receiving machine. The compatibility module 48 uses whatever T.30 shortcuts that it and the receiving machine understand. Once the call is finished, it passes a status message back to the messaging protocol module 38, ending the job.

In this second example, the user of the fax machine incorporating the invention sends a fax to be relayed by a second fax machine to a destination fax machine (i.e., one hop). This is a Group 3 fax, but the recipient for this fax is at a third fax machine, not the immediately receiving machine (second). In this example, the second fax machine again supports the relay feature.

1. The messaging protocol module 38 in the originating machine sends a dial command with a phone number to the fax protocol module 46. The fax protocol module 46 dials the phone, makes the fax connection, and waits for the receiving (second) machine to send the proper frames.
2. The receiving (second) fax machine sends its NSF frame to the first fax machine.
3. The fax protocol module 46 receives the NSF/CSI/DIS and compares the NSF ID to the first fax machine NSF ID. They do not match because, as originally assumed, the second fax machine is not compatible with the fax protocol associated with the fax protocol module 46. The fax protocol module 46 then compares the received NSF ID to the NSF IDS in the NSF list 44. A match is found. The fax protocol module 46 calls the compatibility module 48, passing it the received NSF/CSI/DIS.
4. The compatibility module 48 is now running the T.30 protocol. It builds a capabilities object from the passed NSF/CSI/DIS. It sets the relay capability field to "yes" (this is an example only— the actual bits to set are not relevant at this point). The compatibility module 48 passes this capabilities object to the messaging protocol module 38.
5. The messaging protocol module 38 checks to see that relay is supported in the capabilities object and then sends the message object with the T.4 compressed image to the compatibility module 48. (Note: if relay was not supported by the receiving (second) machine, the messaging protocol module 38 would have terminated the call at this point since the user requested a relay function). The compatibility module 48 uses the message object functions 42 to decode the message object header. The header indicates that this message is to be relayed, and it identifies the endpoint recipient name and phone number. The compatibility module 48 communicates this information to the receiving machine. This communication occurs according to the particular version of the protocol in the compatibility module 48. The messaging protocol module 38 is not concerned with how this occurs, but simply that it does occur.
6. The message object header also points to the parameter data block for the image. The compatibility module 48 uses the message object functions 42 to decode this data block. The compatibility module 48 uses information in the data block to determine the resolution, encoding type, etc., and then sends this information to the receiving (second) machine in the DCS (or NSS etc. according to the protocol version of the second machine).
7. The compatibility module 48 then sends the data from the message object to the receiving (second) machine. The compatibility module 48 uses whatever T.30 shortcuts that it and the receiving (second) machine understand. Once the call is finished, it passes a status message back to the messaging protocol module 38, ending the job.
8. The receiving (second) machine relays the message to the final (third) destination.

In the third example, the user at the second fax machine sends a fax to be relayed by the fax machine incorporating the invention (first fax machine) to the destination fax machine (i.e., one hop). This is a Group 3 fax, but the recipient for this fax is at another fax machine (third), not the immediately receiving (first) fax machine. In this example, the second fax machine supports the relay feature.

1. The user sends the fax with relay turned on from the second fax machine.
2. The phone rings at the first fax machine. The fax protocol module 46 answers the phone and sets up the fax connection.
3. The fax protocol module 46 sends the first fax machine NSF frame and the NSF frame from the NSF list 44 to the second fax machine.
4. The second fax machine returns an NSS frame.
5. The fax protocol module 46 of the first fax machine receives the NSS frame and compares its ID to the fax machine's NSF ID. They do not match. The fax protocol module 46 then compares the received NSS ID to the NSF IDS in the NSF list 44. A match is found. The fax protocol module 46 calls the corresponding compatibility module 48, passing it the received NSS.
6. The compatibility module 48 is now running the T.30 protocol. On a receive, no capability object is passed to the messaging protocol module 38.
7. The compatibility module 48 creates an empty message object with a relay message type.
8. The compatibility module 48 receives the relay routing information by whatever method is used by the second fax machine. The relay routing information is encoded into the message object by using the message object functions 42.

9. The compatibility module 48 receives the data specific information (resolution, encoding, etc.). This information is encoded into the data parameter block of the message object by using the message object functions 42.

10. The compatibility module 48 then receives the data into the message object. The compatibility module 48 uses whatever T.30 shortcuts that it and the sending (second) machine understand. The received data is encoded into the message object as attachment data. The message object is passed to the messaging protocol module 38, and the call is finished.

11. The messaging protocol module 38 recognizes this message object as a relay type and processes it accordingly, eventually forwarding it to its final destination (third fax machine).

In the fourth example, the user of the fax machine incorporating the invention (first) polls for a file (poll by filename) on the other (second) fax machine. In this example, the second fax machine supports the poll by filename feature.

1. The messaging protocol module 38 sends a dial command with a phone number to the fax protocol module 46. The fax protocol module 46 dials the phone, makes the fax connection, and waits for the receiving (second) machine to send the proper frames.

2. The receiving (second) fax machine sends its NSF/CSI/DIS frame to the first fax machine.

3. The fax protocol module 46 receives the NSF/CSI/DIS and compares the NSF ID to the first fax machine's NSF ID. They do not match. The fax protocol module 46 then compares the received NSF ID to the NSF IDS in the NSF list 44. A match is found. The fax protocol module 46 calls the compatibility module 48, passing it the received NSF/CSI/DIS.

4. The compatibility module 48 is now running the T.30 protocol. It builds a capabilities object from the passed NSF/CSI/DIS. It sets the "supports polling for arbitrary files" field to "yes" (this is an example only—the actual bits to set are not relevant). The compatibility module 48 passes this capabilities object to the messaging protocol module 38.

5. The messaging protocol module 38 checks to see that poll by filename is supported in the capabilities object. Seeing that it is, the messaging protocol module 38 then sends a message object with a message type indicating poll by filename to the compatibility module 48. The header of the message object includes the filename to be polled for. (Note: if poll by filename was not supported by the receiving (second) machine, the messaging protocol module 38 would have terminated the call at this point since the user requested a function that was not supported). The compatibility module 48 uses the message object functions 42 to decode the message object header. The header indicates that this message contains a command to poll, and it identifies the filename. The compatibility module 48 communicates this polling command and filename to the receiving (second) fax machine (this is done however the two machines work—perhaps in an NSC frame. The messaging protocol module 38 is not concerned with how this is done).

6. The compatibility module 48 then receives the file from the second machine into a new message object of type poll response. The compatibility module 48 uses whatever T.30 shortcuts that it and the (second) machine understand. Once the call is finished, it passes the new poll response message object to the messaging protocol module 38, ending the job.

7. The message protocol module 38 takes the message object and extracts the file, placing it in the proper place.

Though the previous examples describe in some detail the operation of an embodiment of the invention, it should be understood that the invention is not limited to the features stated or the particular architecture used to carry out these features. For example, it is not critical whether the fax protocol module 46, or a compatibility module 48 performs the selection of the protocol to be used in fax communication. It is also not critical whether an NSF list 44 is used in the selection of a protocol module or whether an NSF frame directly specifies the protocol module that will be used in a fax transmission.

As another example, the portions of the protocol modules that implement versions of the T.30 protocol need not specifically reside in the fax protocol module 46 or the compatibility modules 48. Versions of the T.30 protocol could reside in separate protocol modules and be accessible by either the fax protocol module 46 or the compatibility modules 48 as needed. If protocol modules share functions, these functions could be located such that they are accessible by the protocol modules in a manner similar to the message object functions 42.

Having illustrated and described the principles of the invention in a preferred embodiment, it should be apparent to those skilled in the art that the invention can be modified in arrangement and detail without departing from such principles. We claim all modifications and equivalents coming within the spirit and scope of the following claims.

We claim:

1. A method for increasing the compatibility of a fax machine, comprising:

providing in a first fax machine a plurality of protocol modules each supporting a facsimile transmission protocol for communicating with other fax machines;

receiving in the first fax machine information from a second fax machine identifying the capabilities and a facsimile transmission protocol of the second fax machine;

determining whether the second fax machine is compatible with a protocol module in the first fax machine;

if the second fax machine is compatible with a protocol module in the first fax machine, then:

interpreting the capabilities of the second fax machine by using the protocol module in the first fax machine that is compatible with the second fax machine to read the information identifying capabilities provided by the second fax machine; and communicating between the first and second fax machines using the protocol module in the first fax machine compatible with the second fax machine to implement the facsimile transmission protocol.

2. The method of claim 1 wherein the providing step includes providing protocol modules including a fax protocol module and a compatibility module; and further including the steps:

selecting either the fax protocol module or the compatibility module based on information identifying the capabilities of the second fax machine;

if the compatibility module is selected, then:

interpreting the capabilities of the second fax machine with the compatibility module; and mapping the capabilities of the second fax machine into a capabilities object with the compatibility module.

3. The method of claim 2 wherein there are a plurality of compatibility modules and the selecting step includes comparing information identifying the capabilities of the second machine in an NSF frame with an NSF list to find matching NSF information; and if matching NSF information is found, then selecting from the plurality of compatibility modules the compatibility module corresponding to the matching NSF information.

4. The method of claim 1 wherein the providing step includes providing a plurality of protocol modules and a messaging protocol module; and further including the step:

passing information about the capabilities of the second fax machine from one of the plurality of protocol modules to a messaging protocol module independent of the facsimile transmission protocol by mapping the capabilities of the second fax machine into a capabilities object and passing the capabilities object from said one of the plurality of protocol modules to the messaging protocol module.

5. The method of claim 1 wherein the providing step includes providing a plurality of protocol modules and a messaging protocol module; and further including the steps:

passing information about the capabilities of the second fax machine from one of the plurality of protocol modules to the messaging protocol module independent of the facsimile transmission protocol by mapping the capabilities of the second fax machine into a capabilities object and passing the capabilities object from said one of the plurality of protocol modules to the messaging protocol module; and passing information about a fax transferred between the first and second fax machines independent of the facsimile transmission protocol by passing a message object between said one of the plurality of protocol modules and the messaging protocol module.

6. The method of claim 5 further including the steps:

providing message object functions in communication with the protocol modules; and encoding information about a fax message in a message object using the message object functions.

7. The method of claim 5 further including the steps:

providing message object functions in communication with the protocol modules; and decoding information about a fax message in a message object using the message object functions.

8. A method for increasing the compatibility of a fax machine, comprising:

providing a first fax machine having a messaging protocol module and a plurality of protocol modules including a fax protocol module and at least one compatibility module for communicating with other fax machines using different protocols, each protocol module supporting a facsimile transmission protocol;

receiving information from a second fax machine identifying capabilities and a facsimile transmission protocol of the second fax machine;

selecting one of the plurality of protocol modules based on the information identifying the facsimile transmission protocol of the second fax machine;

passing the information identifying the capabilities of the second fax machine from said one of the plurality of protocol modules to the messaging protocol module by mapping the capabilities into a capabilities object and passing the capabilities object to the messaging protocol module; and if one of the at least one compatibility module is selected, then interpreting the capabilities of the second fax machine by using said one of the at least one compatibility module to read the capabilities of the second fax machine; and mapping the capabilities of the second fax machine into a capabilities object with said one of the at least one compatibility module.

9. The method of claim 8 wherein the selecting step includes comparing information identifying the capabilities of the second machine in an NSF frame with an NSF list to find matching NSF information; and if matching NSF information is found, then selecting one of the at least one compatibility module corresponding to the matching NSF information.

10. The method of claim 8 further including the step:

passing information about a fax transferred between the first and second fax machines independent of the facsimile transmission protocol by passing a message object between said one of the plurality of protocol modules and the messaging protocol module.

11. The method of claim 10 wherein the protocol module is a compatibility module.

12. A system for increasing the compatibility of a first fax machine comprising:

a modem driver for communicating with a second fax machine;

a protocol module in communication with the modem driver for selecting a compatibility module based upon information identifying a facsimile transmission protocol of the second fax machine provided by the second fax machine;

at least one compatibility module in communication with the modem driver for communicating with the second fax machine by implementing a facsimile transmission protocol compatible with the second fax machine, and in communication with the protocol module for building a capabilities object based upon information about the capabilities of the second fax machine provided by the second fax machine;

and a messaging protocol module in communication with the at least one compatibility module for receiving the capabilities object and a message object independent of the facsimile transmission protocol used to communicate with the second fax machine, for reading the capabilities object to determine the capabilities of the second fax machine, and for processing the message object.

13. The system of claim 12 wherein the protocol module is in communication with a NSF list for matching the information about the capabilities of the second fax machine with information in the list to select a compatibility module.

14. The system of claim 12 wherein the protocol module is in communication with the messaging protocol module for transferring a message object between the messaging protocol module and the protocol module.

15. The system of claim 12 wherein the protocol module is in communication with the messaging protocol module for transferring a message object and a capabilities object between the messaging protocol module and the protocol module.

16. The system of claim 12 wherein the at least one compatibility module is in communication with message object functions for encoding and decoding information about a fax message in a message object.

17. A first fax machine compatible with a plurality of fax protocols comprising:

a modem driver for communicating with a second fax machine;

a protocol module in communication with the modem driver for selecting a compatibility module based upon information identifying a facsimile transmission protocol of the second fax machine provided by the second fax machine;

at least one compatibility module in communication with the modem driver for communicating with the second fax machine by implementing a facsimile transmission protocol compatible with the second fax machine, and in communication with the protocol module for building a capabilities object based upon information about the capabilities of the second fax machine provided by the second fax machine;

and a messaging protocol module in communication with the at least one compatibility module for receiving the capabilities object and a message object independent of the facsimile transmission protocol used to communicate with the second fax machine, for reading the capabilities object to determine the capabilities of the second fax machine, and for processing the message object.

18. The first fax machine of claim 17 wherein the protocol module is in communication with a NSF list for matching the information about the capabilities of the second fax machine with information in the list to select one of the at least one compatibility module.

19. The first fax machine of claim 17 wherein the protocol module is in communication with the messaging protocol module for transferring a message object between the messaging protocol module and the protocol module.

20. The first fax machine of claim 17 wherein the protocol module is in communication with the messaging protocol module for transferring a message object and a capabilities object between the messaging protocol module and the protocol module.

21. The first fax machine of claim 17 wherein the at least one compatibility module is in communication with message object functions for encoding and decoding information about a fax message in a message object.

* * * * *